US007848766B2

(12) United States Patent
Ogino et al.

(10) Patent No.: US 7,848,766 B2
(45) Date of Patent: Dec. 7, 2010

(54) WIRELESS TERMINAL POSITION DETECTING METHOD AND SYSTEM THEREFOR

(75) Inventors: Atsushi Ogino, Kodaira (JP); Ryota Yamasaki, Kokubunji (JP); Takaki Uta, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 1018 days.

(21) Appl. No.: 11/483,101

(22) Filed: Jul. 10, 2006

(65) Prior Publication Data

US 2007/0032248 A1 Feb. 8, 2007

(30) Foreign Application Priority Data

Aug. 5, 2005 (JP) ............................. 2005-227375

(51) Int. Cl.
*H04W 24/00* (2009.01)
(52) U.S. Cl. .................................. 455/456.5; 455/456.1
(58) Field of Classification Search ............... 455/456.1, 455/456.5
See application file for complete search history.

(56) References Cited

U.S. PATENT DOCUMENTS

| 6,456,830 | B2 * | 9/2002 | Ogino et al. | 455/134 |
| 6,889,051 | B2 * | 5/2005 | Ogino et al. | 455/456.1 |
| 6,950,664 | B2 * | 9/2005 | Chen et al. | 455/456.5 |
| 7,110,775 | B2 * | 9/2006 | Ogino et al. | 455/456.1 |
| 7,138,946 | B2 * | 11/2006 | Tamaki et al. | 342/463 |
| 7,158,799 | B2 * | 1/2007 | Ogino et al. | 455/457 |
| 7,167,712 | B2 * | 1/2007 | Ogino et al. | 455/456.1 |
| 7,353,032 | B2 * | 4/2008 | Ogino et al. | 455/456.1 |

(Continued)

FOREIGN PATENT DOCUMENTS

JP 08-146110 6/1996

(Continued)

OTHER PUBLICATIONS

Office Action from the Japanese Patent Office, dated May 11, 2010, in Japanese.

*Primary Examiner*—Lester Kincaid
*Assistant Examiner*—Steven Kelley
(74) *Attorney, Agent, or Firm*—Stites & Harbison, PLLC; Juan Carlos A. Marquez, Esq

(57) ABSTRACT

In any indoor location, whenever operating a wireless terminal position detecting system comprising a transferable wireless terminal, a plurality of base stations individually allowing a connection from said wireless terminal, and a plurality of wireless receiving stations individually receiving wireless signal from said terminal and base stations, there is a problem in terms of the provision of a method for minimizing positional detection error on the part of said wireless terminal and a method for practically realizing said method. Hence, to solve the above problem, the present invention provides a wireless terminal position detecting method featuring the function to evaluate the result of measurement against wireless signals from an objective wireless terminal received by individual wireless receiving stations based on a definition of a plurality of position detectable areas designating a geographic range required for detecting actual position of said objective wireless terminal and also based on another definition for specifying plural wireless receiving stations each being located at a predetermined known position allocated for individual areas for detecting actual position of the objective wireless terminal in respective position detectable areas before eventually determining the actual position of the objective wireless terminal.

3 Claims, 11 Drawing Sheets

U.S. PATENT DOCUMENTS

| | | |
|---|---|---|
| 7,355,995 B2 * | 4/2008 | Ogino et al. ................. 370/328 |
| 2001/0044311 A1 | 11/2001 | Larsson et al. |
| 2002/0132625 A1 * | 9/2002 | Ogino et al. ................. 455/456 |
| 2004/0046693 A1 | 3/2004 | Ogino et al. |
| 2005/0078033 A1 | 4/2005 | Tamaki et al. |
| 2006/0105779 A1 * | 5/2006 | Uta et al. ................. 455/456.1 |
| 2006/0234756 A1 * | 10/2006 | Yamasaki et al. ........... 455/525 |

FOREIGN PATENT DOCUMENTS

| | | |
|---|---|---|
| JP | 2002-521991 | 7/2002 |
| JP | 2004-289702 | 3/2003 |
| JP | 2004-221704 | 8/2004 |
| JP | 2005-123662 | 5/2005 |
| JP | 2005-184729 | 7/2005 |

* cited by examiner

FIG. 2

| POSITION DETECTING AREA ID NO. | POSITION DETECTING AREA DEFINITION (X, Y, Z) [m] | RADIO RECEIVING STATION ID NO. |
|---|---|---|
| 1Z1 | (198, 106, 1)<br>(218, 175, 1)<br>(120, 194, 1)<br>(120, 115, 1) | 1R11<br>1R21<br>1R33<br>1R73 |
| 1Z2 | (120, 194, 1)<br>(40, 160, 1)<br>(25, 118, 1)<br>(72, 77, 1)<br>(120, 115, 1) | 1R33<br>1R42<br>1R52<br>1R62<br>1R73 |
| 1Z4 | (55, 24, 7)<br>(202, 42, 7) | 1R84<br>1R94<br>1Ra4 |
| ... | ... | ... |

FIG. 3

| RADIO RECEIVING STATION ID NO. | NETWORK ADDRESS | RADIO RECEIVING STATION POSITION (X, Y, Z) [m] | BASE STATION ID NO. |
|---|---|---|---|
| 1R11 | 192.168.1.1 | (198, 106, 2) | 1A1 |
| 1R21 | 192.168.1.2 | (218, 175, 2) | 1A1 |
| ... | ... | ... | ... |
| 1R73 | 192.168.1.7 | (120, 115, 2) | 1A1<br>1A2 |
| ... | ... | ... | ... |

FIG. 4A

| BASE STATION ID NO. | RADIO NETWORK ADDRESS AT TERMINAL | NETWORK ADDRESS AT INFRASTRUCTURE |
|---|---|---|
| 1A1 | 01:ff:02:03:04:a1 | 192.168.1.201 |
| 1A2 | 01:ff:02:03:04:a2 | 192.168.1.202 |
| 1A3 | 01:ff:02:03:04:a3 | 192.168.1.203 |
| ... | ... | ... |

FIG. 4B

| BASE STATION ID NO. | PHY STANDARD | RADIO CHANNEL [MHz] |
|---|---|---|
| 1A1 | HR/DSSS | 2412 |
| 1A2 | HR/DSSS | 2437 |
| 1A3 | DSSS | 2462 |
| ... | ... | ... |

FIG. 4C

| BASE STATION ID NO. | BASE STATION POSITION (X, Y, Z) [m] | POSITION DETECTING AREA ID NO. |
|---|---|---|
| 1A1 | (162, 144, 3) | 1Z1<br>1Z2 |
| 1A2 | (74, 125, 3) | 1Z1<br>1Z2 |
| 1A3 | (125, 16, 9) | 1Z4 |
| ... | ... | ... |

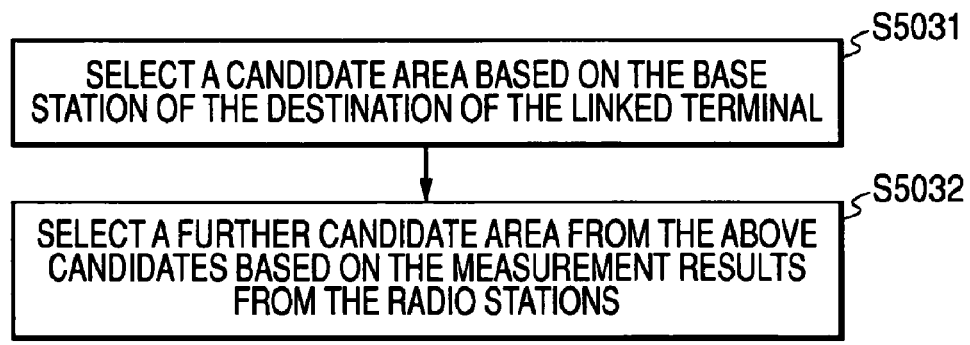
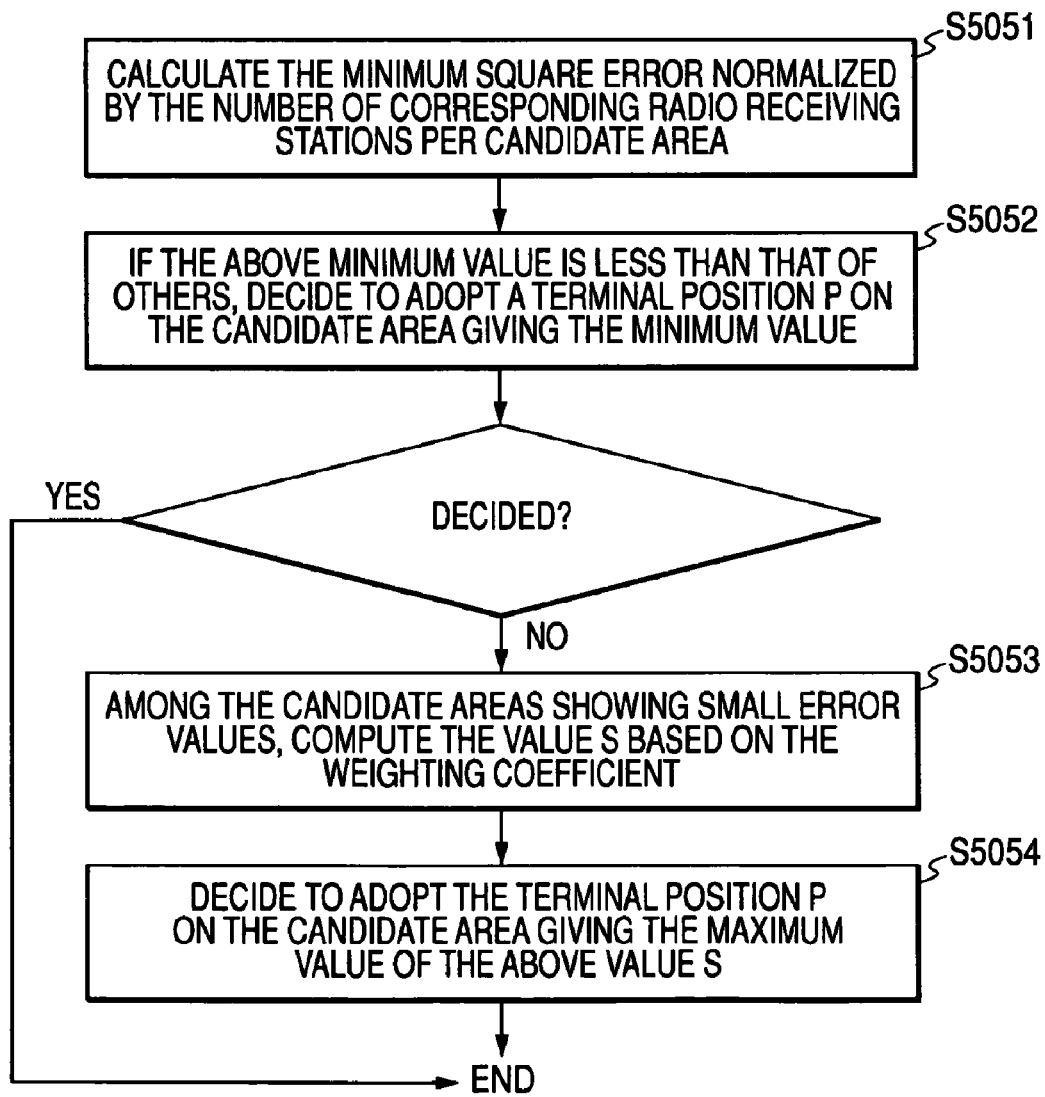

WIRELESS TERMINAL POSITION DETECTING METHOD AND SYSTEM THEREFOR

CLAIM OF PRIORITY

The present application claims priority from the Japanese application JP 2005-227375 filed on Aug. 5, 2005, the content of which is hereby incorporated by reference into this application.

FIELD OF THE INVENTION

The present invention relates to a method of detecting the actual position of a wireless terminal based on the results of distance measurement by applying electromagnetic waves. In particular, the present invention relates to a method of detecting the actual position of a wireless terminal in a wireless LAN system.

BACKGROUND OF THE INVENTION

According to JP 2004-101254 A, a prior art was disclosed, which, based on the reception time and positions of a base station and respective wireless receiving stations, detects the actual position of a wireless terminal in a wireless LAN system upon reception of wireless signals transmitted from a base station and a wireless terminal via a plurality of wireless receiving stations.

According to the same JP 2004-101254 A, in order to detect the actual position of a designated wireless terminal, the above prior art selects a plurality of wireless receiving stations geographically adjoining a base station complete with association (connection) with the corresponding wireless terminal.

SUMMARY OF THE INVENTION

In the case in which a plurality of base stations enabling linkage of any wireless terminal is present, the terminal is not always linked with any of the nearest base stations. This is because the wireless terminal may shift its own position within a time shorter than that is required for establishing the next connection. There is another reason in which the wireless terminal may have already been adjusted so as to be capable of linking with a base station transmitting wireless signals capable of optimizing reception characteristics (e.g., maximizing intensity of receivable signals) on the part of the corresponding wireless terminal. Hence, depending on the wave environment surrounding wireless terminals, there may be a case in which reception characteristics of wireless signals from a remote base station may be optimized for the corresponding wireless terminal, thereby causing the terminal to be linked with the base station. Once the latter case occurs, it entails a marked problem in the indoor location having any obstacle such as a wall or a shelf that shields or reflects wireless signals. When this condition is present, if the above-cited method were adopted for selecting any of the plural wireless receiving stations that are available for detecting the actual position of a wireless terminal and linked with this wireless terminal connected to a geographically adjoining base station, it may possibly entail a case in which a plurality of selected wireless receiving stations can hardly surround the corresponding terminal. Hence, due to degraded GDOP (geometric dilution of precision), it may possibly result in the increased error in the detection of the actual position of the objective wireless terminal. On the other hand, if the distance pertaining to the above-referred adjacency were defined to be longer, it will in turn promote a possibility of allowing the presence of any obstacle that may shield or reflect wireless signals in the wave transport path between the corresponding wireless terminal and the linked base station or a wireless receiving station. Once this problem arises, it will become quite difficult to correctly measure wireless signals directly transmitted from a transmitter, thereby causing substantial error components to remain in respective reception time measuring units in the linked wireless station before eventually causing the position detecting error to be increased on the part of the corresponding wireless terminal. Occurrence of this problem is particularly noticeable in the indoor location having any obstacle that readily shields or reflects wireless signals.

Hence, the present invention provides a method of minimizing position detecting errors on the part of a wireless terminal by selecting a group of optimum wireless receiving stations whenever operating the wireless terminal position detecting system in any indoor location, wherein the wireless terminal position detecting system essentially comprises the following: a transferable wireless terminal, a plurality of base stations individually allowing connection from the wireless terminal, and a plurality of wireless receiving stations individually receiving wireless signals from the wireless terminal and any of the base stations. The present invention securely solves the above conventional problems by providing a novel system described below.

To address the above problems, the present invention provides a method of detecting the wireless terminal position by adopting practical means comprising the following: based on the definition of a plurality of position detecting areas designating a geographical range for detecting the actual position of an objective wireless terminal and also based on the other definition for specifying a plurality of wireless receiving stations, each having previously known positions allocated for individual areas so as to detect the actual position of an objective wireless terminal in respective position detectable areas, it is so arranged that the result of the measurement related to wireless signals from the objective wireless terminal received by respective wireless receiving stations is evaluated per position detecting area before eventually determining the actual position of the objective wireless terminal.

According to the present invention, it is possible to minimize error in the detection of the actual position of an objective wireless terminal independently of any actual condition in which a transferable wireless terminal may have already been linked with any of the plural base stations in an indoor location.

BRIEF DESCRIPTION OF THE DRAWINGS

FIG. 2 is a table diagram classifying the information on the position detectable areas stored in the position computing unit in the wireless terminal position detecting system related to the present invention.

FIG. 3 is a table diagram classifying the information on the wireless receiving stations stored in the position computing unit in the wireless terminal position detecting system related to the present invention;

FIG. 4 is a table diagram classifying the information on the base stations stored in the position computing unit in the wireless terminal detecting system related to the present invention;

FIG. 6 is an operational flowchart exemplifying a method of selecting a candidate area for detecting the wireless terminal position in the wireless terminal position detecting method related to the present invention;

FIG. 7 is an operational flowchart exemplifying a method of selecting a candidate area for detecting the wireless terminal position in the wireless terminal position detecting method related to the present invention;

DESCRIPTION OF THE PREFERRED EMBODIMENTS

Embodiment 1

Figure 1:
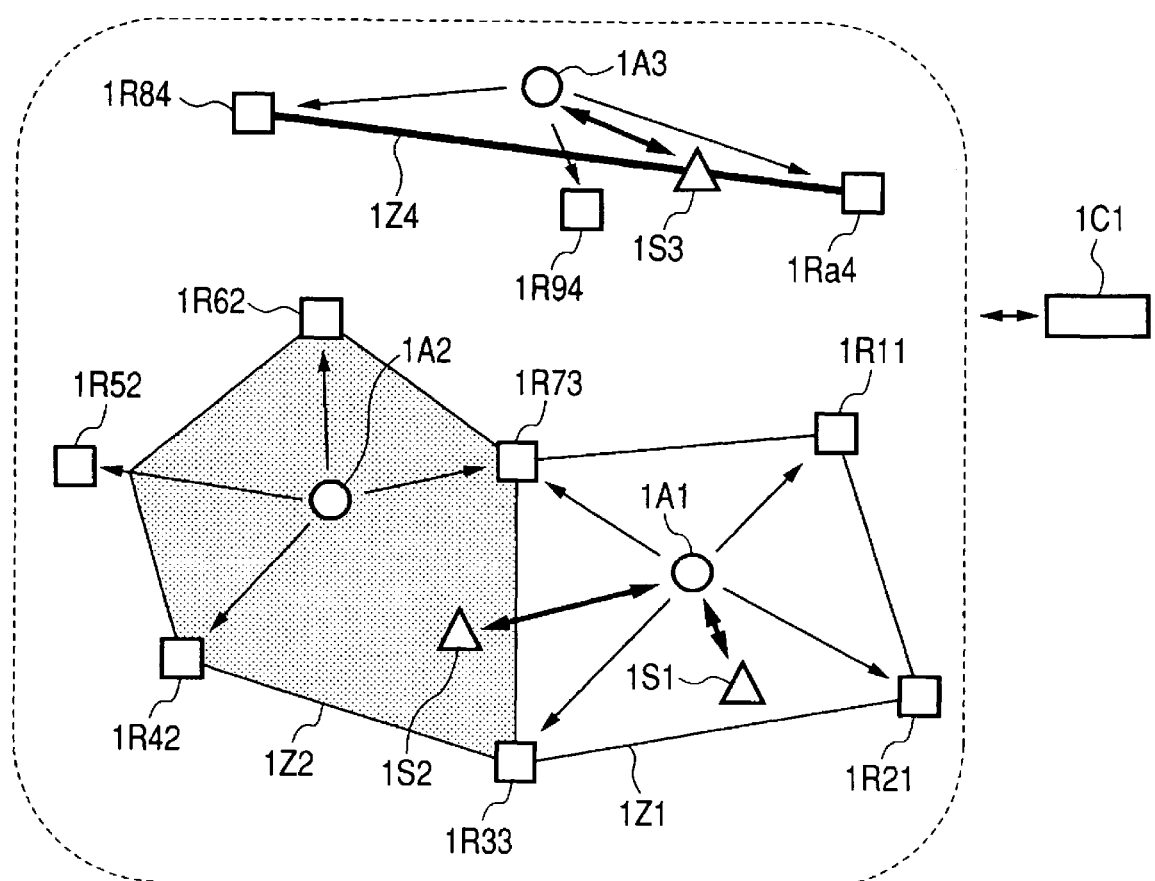
FIG. 1 is a schematic block diagram exemplifying a configuration of the wireless terminal position detecting system embodied by the present invention.

Referring now to FIG. 1, a preferred embodiment of the wireless terminal position detecting system based on the present invention is described hereinafter. In FIG. 1, reference numerals 1A1, 1A2, and 1A3, respectively designate a base station. Reference numerals 1S1, 1S2, and 1S3 respectively designate a terminal. Reference numeral 1C1 designates a position-computing unit. Reference numerals 1Z1, 1Z2, and 1Z4, respectively designate a position detecting area within a geographic range predetermined for detecting the actual position of an objective wireless terminal. Reference numerals 1R11, 1R21, 1R33, 1R42, 1R52, 1R62, 1R73, 1R84, 1R94, and 1Ra4, respectively designate a wireless receiving station. Individual base stations and a wireless terminal respectively correspond to access points and a wireless receiving station conforming to the IEEE Standard 802.11 for example.

An individual wireless receiving station contains an integrated function capable of executing (1) reception of a wireless packet signal (this will merely be called a frame hereinafter) transmitted from a base station or a wireless terminal, (2) analysis of the header portion of a received frame, and (3) measurement of the RSSI (Received Signal Strength Indicator) value. In addition, any of the individual wireless receiving stations further includes a function capable of measuring the actual time of receiving each frame, based on the clock time held therein.

The above-cited base stations 1A1, 1A2, and 1A3, and the wireless receiving stations 1R11, 1R21, 1R33, 1R42, 1R52, 1R62, 1R73, 1R84, 1R94, and 1Ra4, are individually linked with the above-cited position computing unit 1C1 via a cable network or a wireless network.

Any of the above wireless receiving stations informs the above position computer 1C1 of the reception time of the received/measured frame and the above-referred RSSI value. Any of the above wireless receiving stations is allowed to apply a base station cited in the above-referred Japanese Patent publication No. 2004-101254. Details will be described afterwards.

The position computing unit 1C1 contains a function to determine the actual position of an objective wireless terminal based on the predetermined positions of individual wireless receiving stations and also based on the frame reception time reported from individual wireless receiving stations. The position computing unit 1C1 is also capable of applying a computer loaded with the above-cited function. Details will be described afterwards.

An individual position detecting area is shown in the polygonal form and in the form of line segments on a plane. Two or more than two of the wireless receiving stations available for detecting the actual position of an objective wireless terminal are adequately allocated for individual position detectable areas. In order that the actual position of an objective wireless terminal present in the allocated position detectable area can be detected accurately, individual wireless receiving stations are properly adjusted and disposed. For example, in order that the GDOP (geometric dilution of precision) can satisfy a predetermined level in correspondence with an optional position within a position detectable area, the number of the wireless receiving stations subject to installation and the installing locations may be adjusted properly. Alternatively, it is suggested that the wireless receiving stations may be installed in the manner satisfying the first installation criterion cited for example below.

The first criterion for installing wireless receiving stations regulates that an individual wireless receiving station shall be installed at least on all the vertices of the convex comprising an assembly of vertices on a polygonal form denoting an individual position detectable area, where the vertices of the convex also include the adjoining portions and the polygonal form also includes the case in which the position detectable area consists of line segments.

For example, in FIG. 1, five wireless receiving stations comprising 1R33, 1R42, 1R52, 1R62, and 1R73, are allocated for the position detectable area 1Z2. These wireless receiving stations are individually disposed on the vertices of the corresponding area having a pentagonal convex form or in such locations close to the vertices thereof.

In order that the first and second criteria applicable to the base stations can be satisfied simultaneously, the number of the base stations is properly adjusted for disposition.

The first criterion applicable to the base station regulates that at least each unit of wireless terminals and base stations capable of satisfying a predetermined quality and exchanging frames shall essentially exist within an individual position detectable area.

The second criterion applicable to the base station regulates the following prerequisite condition:

In optional pairs of a plurality of wireless receiving stations allocated for an identical position detectable area, it is so regulated that either of a pair of wireless receiving stations shall be called the first wireless receiving station and the other shall be called the second wireless receiving station.

It is also regulated that any base station transmitting a predetermined frame so as to enable the first wireless receiving station to measure its reception time shall be called the first base station, whereas any base station transmitting a predetermined frame so as to enable the second wireless receiving station to measure its reception time shall be called the second base station.

It is identified whether or not the above-cited first and second base stations can become the one identical to each other correspondingly with the above-cited first and second wireless receiving stations. Alternatively, it is regulated that at least one unit of a third wireless receiving station capable of measuring the reception time of a predetermined frame and being allocated for the above-referred position detectable area shall essentially be present therein.

For example, by referring to FIG. 1, the first and second installation criteria related to the above-referred base stations are described below. The base station 1A1 is installed by way of enabling frames to be exchanged with what is stored in an objective wireless terminal located in the position detectable area 1Z1 so as to eventually satisfy the predetermined quality. Further, the base station 1A2 is installed by way of enabling frames to be exchanged with the one stored in an objective wireless terminal present in the position detectable area 1Z2 so as to eventually satisfy the predetermined quality. Any pair formed among the wireless receiving stations 1R11, 1R21, 1R33, and 1R73, allocated for the above position detectable area 1Z1 can measure the reception time of a predetermined frame transmitted from the base station 1A1. On the other hand, any optional pair formed among the wireless receiving stations 1R33, 1R42, 1R52, 1R62, and 1R73 allocated for the position detectable area 1Z2 can measure the reception time of a predetermined frame transmitted from the base station 1A2 by way of excluding 1R33. A pair formed with the wireless receiving stations 1R73 and 1R33 can measure the reception time of a predetermined frame transmitted from the base station 1A1. In the case when another pair has been formed with the wireless receiving station 1R33 and any of the wireless receiving stations 1R42, 1R52, or 1R62, by designating the wireless receiving station 1R33 to become the first wireless receiving station and any of the wireless receiving stations 1R42, 1R52, and 1R62 to become the second wireless receiving station, the first base station corresponds to 1A1, and the second base station corresponds to 1A2, and thus, the wireless receiving station 1R73 becomes the third wireless receiving station.

In order to efficiently detect the actual position of an objective wireless terminal, various kinds of data pertaining to the position detectable area, wireless receiving stations, and base stations, are at least provisionally and partially stored in the position computing unit 1C1.

In the above system, the position computing unit 1C1 stores data related to the position detectable area, the data corresponding to the definition of the position detectable area, and also the data defining the corresponding relationship between the position detectable area and individual wireless receiving stations allocated for the position detectable area. For example, the position computing unit 1C1 stores the information shown in FIG. 2. According to FIG. 2, for example, the position detectable area corresponding to the ID No. 1Z4 corresponds to the line-segmented position detectable area defined by a pair of vertices (X, Y, Z) [m]=(55, 24, 7), (202, 42, 7), thereby indicating that the ID number 1Z4 is allocated for the three wireless receiving stations including 1R84, 1R94, and 1Ra4 in the corresponding position detectable areas.

The position computing unit 1C1 further stores the data including the one that defines the corresponding relationship between individual wireless receiving stations and network addresses on the part of the infrastructure (i.e., on the part of the position computing unit 1C1); the one that defines the corresponding relationship between individual wireless receiving stations and their positions (coordinates); and the other one that defines the corresponding relationship between individual wireless receiving stations and individual base stations capable of measuring the time of receiving frames from the corresponding wireless receiving stations. For example, the position computing unit 1C1 stores the data shown in FIG. 3. According to FIG. 3, for example, the wireless receiving station corresponding to the ID No. 1R73 contains own network addresses (IP addresses) 192. 168. 1.7. Correspondingly, the antenna designating position of said wireless receiving station is identified as (X, Y, Z) [m]=(120, 115, 2). Hence, it is indicated that measurement of the reception time of specific frames transmitted from a couple of base stations each having the ID No. 1A1 and 1A2 is practically achievable.

The position computing unit 1C1 further stores various data including the following: the data designating the corresponding relationship between the base stations and the wireless network addresses on the part of wireless terminals; the data designating the corresponding relationship between the base stations and the network addresses on the part of infrastructure (i.e., on the part of the position computing unit 1C1); the data designating the corresponding relationship between the base stations and their PHY (physical layer) standard and the wireless channels; and the data designating the corresponding relationship between the base stations and their positions (coordinates) and the area in which an objective wireless terminal accessible to these base stations is present. For example, one of the base stations bearing the ID No. 1A1 stores the terminal-side wireless network address (MAC address) [01: ff: 02: 03: 04: al] and network addresses (IP addresses) [192. 168. 1.201] on the infrastructure side (on the part of the above position computing unit 1C1). As the PHY standard, the position computing unit 1C1 applies the HR/DSSS (High Rate/Direct Sequence Spread Spectrum) format and also applies 2412 MHz for the wireless channel whose antenna position is rated at (X, Y, Z) [m]=(162, 144, 3). It is further indicated that a certain number of wireless terminals linked with the above base stations may possibly be present in the position detectable areas bearing own ID numbers 1Z1 and 1Z2.

Figure 5:
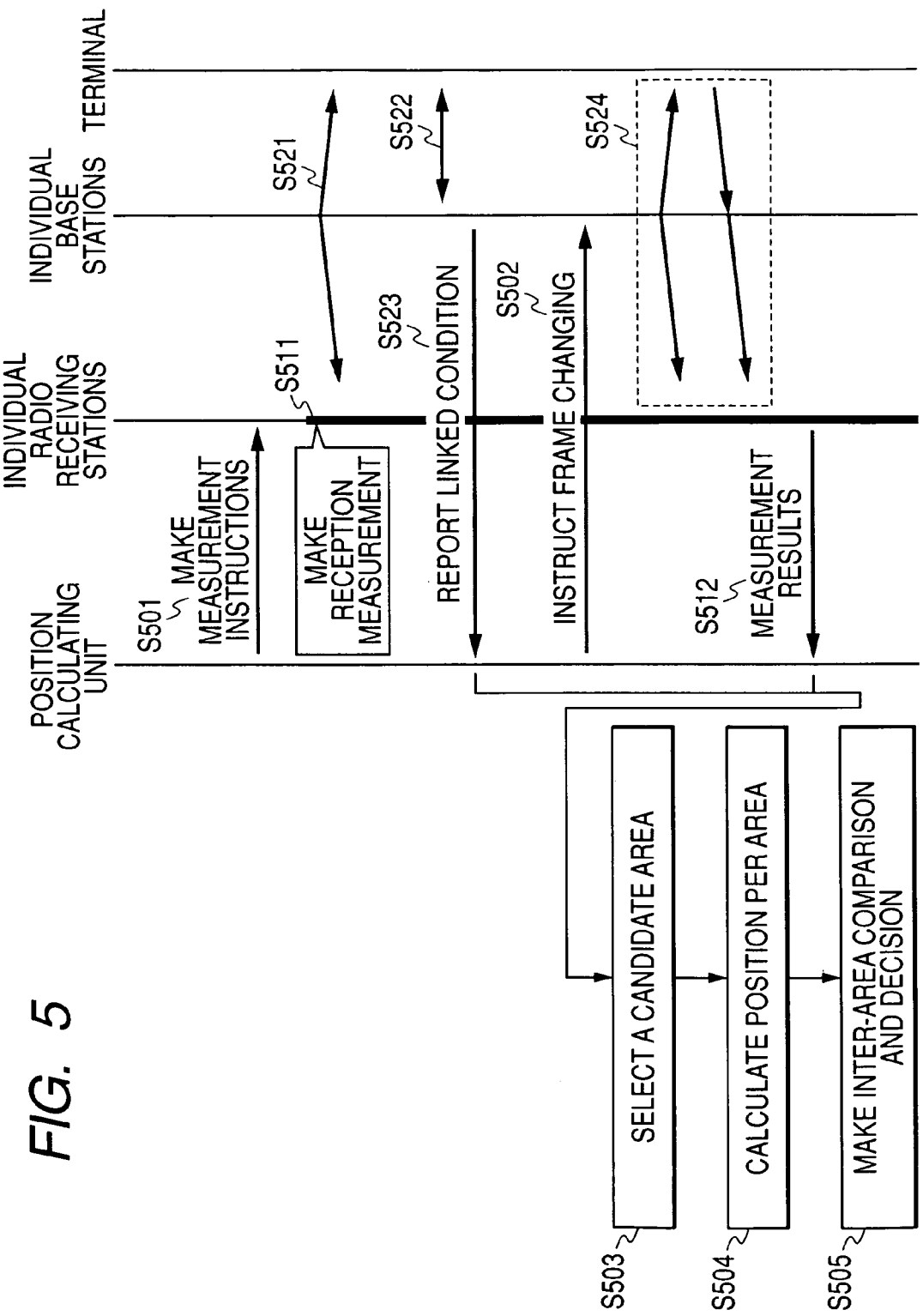
FIG. 5 is an operational flowchart exemplifying serial steps of the wireless terminal position detecting method related to the present invention.

Referring now to FIG. 5, the operational flowchart for detecting a terminal position based on the wireless terminal position detecting system related to the present invention is described below. Individual wireless receiving stations are previously provided with the measurement instructions S501. The instructions S501 may also be generated by the position computing unit 1C1. The instructions S501 include information required for enabling any of the wireless receiving stations to receive predetermined frames from a predetermined terminal or a predetermined base station. Detailed contents of the instructions S501 will be described afterwards.

Individual base stations periodically broadcast a specific frame S521. For example, if a corresponding base station corresponds to an access point based on the IEEE Standard 802.11, the corresponding base station is allowed to apply the beaconing frame as a specific one.

When the state S522 shown in FIG. 3 has been established between an objective wireless terminal and a base station, the corresponding base station generates a report on the identifying data (e.g., MAC address) of the wireless terminal newly linked therewith via a report S523 covering the link condition.

Base stations are individually provided with the frame exchange instructions S502, which may otherwise be delivered from the position computing unit 1C1. The moment and the frequency to generate the above instructions S502 is adequately adjusted in response to the request for detecting the actual position of an objective wireless terminal. The above instructions S502 include data for enabling individual base stations to exchange a predetermined frame with a predetermined wireless terminal. Upon reception of the instructions S502, the recipient base station executes an exchange S524 of a predetermined frame with a predetermined wireless terminal. For example, if a certain base station corresponds to an access point conforming to the IEEE Standard 802.11, as the exchangeable objective frame, the corresponding base station is allowed to apply a pair comprising a data frame and an acknowledging (ACK) frame or another pair comprising an RTS (Request To Send) frame and a CTS (Clear To Send) frame. It is also possible for any of the base stations to execute the frame exchange for plural times based on the frame exchange instructions received once.

Since the frame exchanged between any of the base stations and any of the wireless terminals comprises wireless signals, if the above-cited PHY (physical layer) function and wireless channels were properly set, any of the wireless receiving stations is enabled to properly receive the above frame. Based on the above-referred measurement instructions S501, any of the wireless receiving stations internally sets the PHY function and wireless channels and executes the reception-measuring step S511. During this measuring step, any of the wireless receiving stations measures the actual time of receiving the frame by referring to the clock function stored therein. Further, any of the wireless receiving stations measures the intensity value of the received frame signal, and then analyzes the frame so as to identify whether or not the received frame exactly corresponds to the predetermined frame transmitted from a predetermined wireless terminal or a predetermined base station.

Of those results from the measurement of the received frame, in regard to the result related to the previously designated predetermined frame, the recipient wireless receiving station submits a report on this frame to the position computing unit 1C1 as the measured result S512. Instead of this, it is also possible for the recipient wireless receiving station to collect the results related to the predetermined frame into plural units and periodically submit a report on these results to the position computing unit 1C1 as the measured result S512. Details of the contents of the measured data will be described afterwards.

The position computing unit 1C1 executes detection of the actual position of an objective wireless terminal via serial steps S503, S504, and S505.

In the above position detecting step S503, the above detecting system selects candidates for enabling selection of a specific position detectable area designating the presence of an objective wireless terminal and also selection of a specific position detectable area so as to identify any of the wireless receiving stations being present and essentially capable of ensuring high-precision measurement of the actual position of the objective wireless terminal. In step S503, as shown in FIG. 6, a candidate area is selected by implementing sub-steps S5031 and S5032 described below.

Sub-step S5031 selects a candidate position detectable area designating the presence of a wireless terminal as the object of positional detection by referring to a plurality of reports S523 on the linked condition submitted from individual base stations and previously prepared data (shown in FIG. 4(C)) designating the corresponding relationship between base stations and those areas designating the presence of wireless terminals being the objects of positional detection. For example, when a base station 1A1 corresponds to the linked destination of a wireless terminal being the object of positional detection, it is presumed that this wireless terminal is located in the position detectable area 1Z1 or 1Z2.

By referring to the report on the results of measurement submitted from individual wireless receiving stations allocated for individual candidate areas, the sub-step S5032 strictly selects some areas designating the presence of an objective wireless terminal from individual candidate areas previously selected via the sub-step S5031. Concretely, it is allowable for the sub-step S5032 to apply either or both of the selecting methods cited below simultaneously.

Selecting Method 1:

Of those wireless receiving stations allocated for an individual candidate area via the preceding sub-step S5031, if the number of wireless receiving stations previously known via the report on the results of measurement pertaining to the wireless terminal exceeds a threshold value predetermined for the corresponding area, the sub-step S5032 eventually selects this area as the candidate area in this step.

Selecting Method 2:

In the results of measurement pertaining to the objective wireless terminal submitted by individual wireless receiving stations allocated for an individual candidate area via the preceding sub-step S5031, if the sum of the above results fully satisfies the predetermined condition related to the corresponding area, the sub-step S5032 eventually selects this area as the candidate area in this step.

Figure 14:
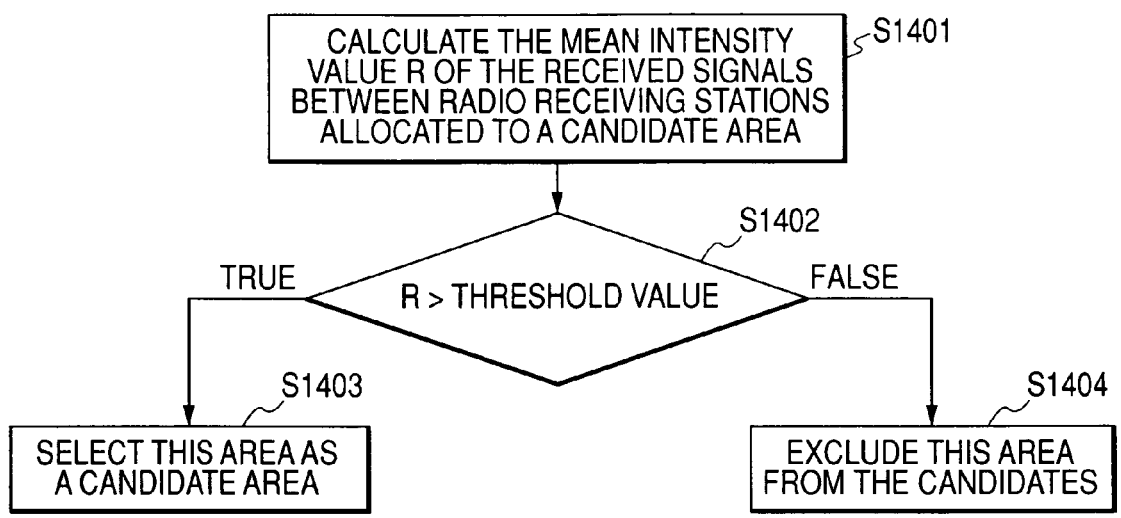
FIG. 14 is an operational flowchart exemplifying details of the method of selecting a candidate area for detecting the actual position of an objective wireless terminal.

For example, as shown in FIG. 14, in reference to the results of measurement pertaining to the objective wireless terminal submitted by individual wireless receiving stations allocated for an individual candidate area via the preceding step S5031, the position computing unit 1C1 calculates a mean value R of the intensity values of received signals contained in respective results between individual wireless receiving stations in step S1401, and then compares the mean value R to the predetermined threshold value pertaining to the candidate area in the step S1402. If the mean value R of the intensity values of the received signals were identified in excess of the predetermined threshold value, operational step proceeds to step S1403, in which the corresponding area is eventually selected as the candidate area in this step. Otherwise, the corresponding area is excluded from the candidate area in step S1404.

Step S504 calculates the actual positions of individual wireless terminals per candidate area by referring to the results of measurement acquired via individual wireless receiving stations allocated for respective candidate areas. For example, it is possible to calculate the positions of individual wireless terminals in respective candidate areas as a vector amount P that provides the minimum value $E_{min}$ of the square error E(P, d) shown in equation 1. In the following equation 1, A denotes the whole points on the candidate area; n denotes the number of wireless receiving stations allocated for individual candidate areas; d denotes clock error in the reference wireless receiving station; tk denotes the frame receiving time in respective wireless receiving stations transmitted from individual wireless terminals; Wk denotes nonnegative weighing coefficient designating reliability on the measurement of reception time in respective wireless receiving stations; c denotes wave transmitting speed; Pk denotes positions of individual wireless receiving stations; and ||x|| denotes the magnitude of vector x. It should be noted that 0 or 1 is adopted for Wk when the reliability on the measurement of reception time can hardly be secured. The value 0 is adopted for any of the wireless receiving stations that failed to submit the report on the results of measurement. The above-cited tk is corrected to the clock reception time on the part of individual wireless receiving stations. In order to secure the tk value, it is possible to apply a method described in the above-cited Japanese Patent publication 1 or 2. Details of the contents thereof will be described later on.

$$E_{min} = \min_{P \in A, d} \{E(P, d)\}, \quad \text{Equation 1}$$

$$E(P, d) = \sum_{k=1}^{n} W_k \{(t_k + d)c - \|P_k - P\|\}^2$$

Step S505 determines the actual position of an objective wireless terminal after comparing the results of positional computations in respective candidate areas. In the preceding step S504, values of the position P of the corresponding wireless terminal, the minimum square error $E_{min}$, the number of wireless receiving stations n, and weighing coefficient {W1, W2, ..., Wn} are respectively secured. In the preceding step S504, after comparing the results between respective candidate areas, positions of individual wireless terminals are determined into one. In step S505, positions of wireless terminals are determined into one via the sub-steps including S5051, S5052, S5053, and S5054.

Sub-step S5051 calculates the minimum square error value ($E_{min}/n'$) normalized by the number n of respective wireless terminals, each having a non-zero weighing coefficient allocated for individual candidate areas per candidate area.

If the minimum value of the above normalized minimum square error were identified to be less than other minimum square error values, i.e., when the comparative value to others and the difference from others are less than the predetermined threshold value, the sub-step S5052 determines to adopt the position P of a wireless terminal located in the candidate area providing the minimum value thereof.

Otherwise, among those candidate areas containing the normalized minimum square error value below the predetermined threshold value based on the above-cited minimum value, the sub-step S5053 calculates the value S shown in the equation 2 or 3 based on the above-cited weighing coefficient.

$$S = \sum_{k=1}^{n} \delta_k, \text{ where } \delta_k = W_k \quad \text{Equation 2}$$

$$S = \sum_{k=1}^{n} \delta_k, \text{ where } \delta_k = \begin{cases} 0 & (W_k = 0) \\ 1 & (W_k > 0) \end{cases} \quad \text{Equation 3}$$

The sub-step S5054 eventually determines to adopt the position P of an objective wireless terminal in the candidate area providing the maximum S value.

In other words, among those positions of wireless terminals calculated in respective candidate areas, after determining the position of a specific wireless terminal generating the minimum square error value, if it were impracticable to determine the position of an objective wireless terminal due to the absence of a remarkable difference in respective error values, the above sub-step S5054 eventually determines the position of the corresponding wireless terminal detected via a greater number of wireless receiving stations among those positions identified to be of the least error and highly reliable in terms of the reception measurement.

Figure 8:
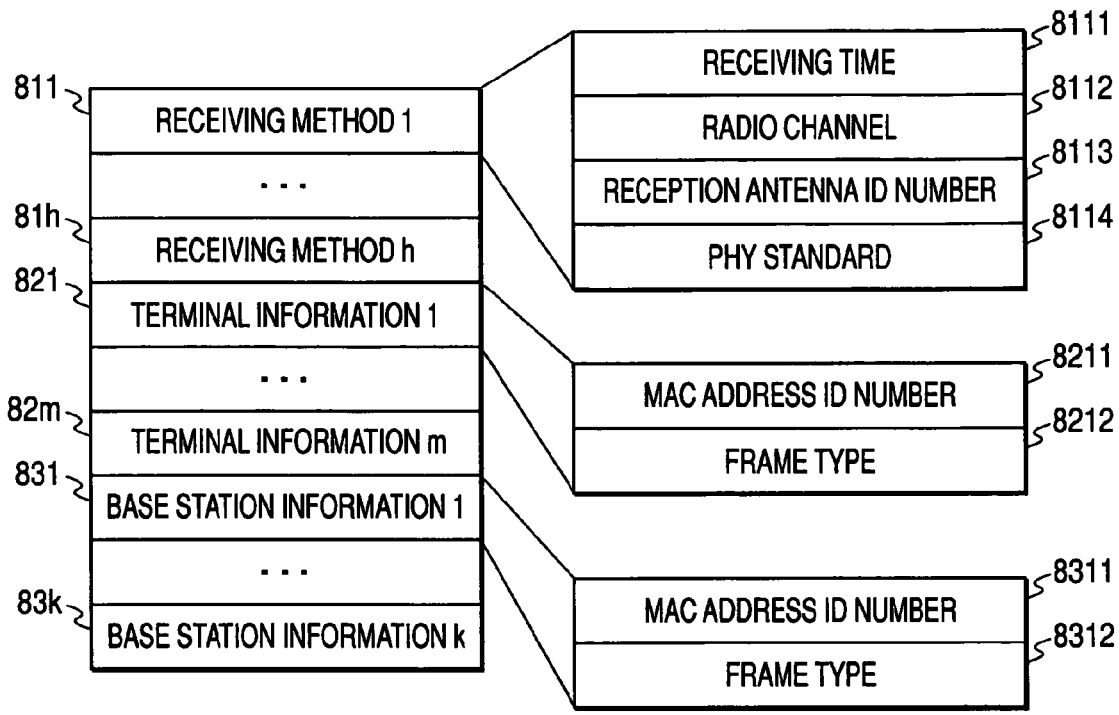
FIG. 8 is a formatted system configuration exemplifying the contents of the measurement instructions transmitted to wire receiving stations in the wireless terminal detecting method related to the present invention.

Next, details of the contents of the measurement instructions S501 delivered to individual wireless receiving stations are described below. As shown in FIG. 8 for example, the above instructions S501 includes the data required for individual wireless receiving stations to receive the predetermined frame from the predetermined wireless terminals or from the predetermined base stations.

In FIG. 8, wireless signal reception methods 811~81h represent the data related to single or plural methods for receiving wireless signals to be introduced to individual wireless receiving stations. For example, the reception method 811 includes the reception time 8111, wireless channel 8112, reception antenna identifying number 8113, and the PHY Standard 8114. The reception time 8111 designates the time for measuring reception executed by the application of the reception method 811. The wireless channel 8112 designates the wireless channel available for measuring the reception. The reception antenna-identifying number 8113 designates the number for specifying antennas available for measuring the reception by those wireless receiving stations individually having plural antennas. The PHY Standard 8114 designates the PHY (physical layer) standard that should compatibly be applied to the reception measurement. After an elapse of a reception time via a reception method, individual wireless receiving stations respectively execute the reception measurement in accordance with the ensuing reception method. After completing the reception measurement up to the reception method 81h, the procedure is reverted to the initial reception method 811 so as to repeat the reception measurement.

Terminal information 821, ..., 82m respectively constitute various data related to single or plural wireless terminals as the transmitter of frames to be received by wireless receiving stations. For example, the terminal information includes an identifying number 8211 and a frame type 8212. The identifying number 8211 constitutes data for specifying a wireless terminal as the transmitter of frames to be received by wireless receiving stations. To constitute the identifying number, for example, it is possible to adopt a MAC address of a wireless terminal. Particularly, among those frames transmissible via a wireless terminal, the frame type 8212 constitutes a data for specifying the type of frame to be received by any of the wireless receiving stations. As a practically applicable frame type, it is suggested that "ACK" provided for by the "Type and sub-type field" within the frame control field of the IEEE-802.11, may be specified, for example.

Base station information 831, ..., 83k respectively constitute various data related to single or plural base stations as the transmitter of frames to be received by wireless receiving stations. For example, the base station information includes an identifying number 8311 and a frame type 8312. The identifying number 8311 constitutes a data for specifying a base station as the transmitter of a frame to be received by wireless receiving stations. To constitute the identifying number, for example, it is possible to adopt a MAC address of a wireless network on the terminal side of a base station. In particular, among those frames transmitted by a base station, the frame type 8312 constitutes data for specifying the type of frame to be received by any of wireless receiving stations. As a practically applicable frame type, it is suggested that "Beacon" or "Null function" provided for by the "Type and sub-type field" within the frame control field of the IEEE-802.11, may be specified, for example.

Figure 9:
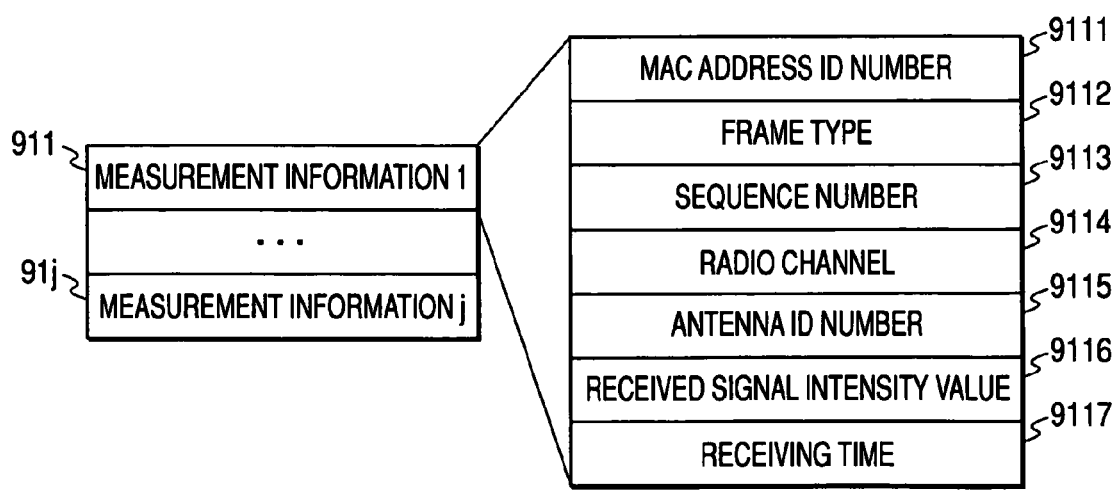
FIG. 9 is a formatted system configuration exemplifying the contents of the measurement result reported from the wireless receiving stations in the wireless terminal detecting method related to the present invention.

Next, details of the contents of the measurement result S512 against the position computing unit 1C1 on the part of any of wireless receiving stations are described below. The measurement result includes the measured data filled with the result of single or plural rounds of reception measurement as shown in FIG. 9 for example. In FIG. 9, measurement data 911~91j respectively contain the result of reception measurement related to a single frame transmitted from a wireless terminal or a base station. For example, the measurement result data 911 contains various data including the ID number 9111, the frame type 9112, the sequence number 9113, wireless channel number 9114, antenna identifying number 9115, received signal intensity value 9116, and the reception time 9116. The ID number 9111 serves as the data for identifying a wireless terminal or a base station as the transmitter of the frame in the measurement data To constitute the ID number, for example, it is allowable to apply a MAC address of a wireless terminal or another MAC address belonging to a wireless network on the terminal side of a base station. Note that there is such a frame devoid of the ID number of the transmitter. For example, the [ACK] frame corresponds to this kind. In this case, it is allowable to specify the ID number of the transmitter by substituting the ID number of the transmitter of a pairing data frame for the frame devoid of the ID number. The frame type 9112 constitutes a data for specifying the frame type included in the above measurement result data 911. As for the frame type, for example, it is predetermined that the "Type and sub-type field" value within the frame control field defined in the IEEE Standard 802.11 shall be applied. The sequence number 9113 serves as data for specifying the time-wise sequence of frames in the above measurement result data. To constitute the sequence number, it is predetermined that the "Sequence control field" value within the frame control field defined by the IEEE Standard 802.11 shall be applied.

Note that there is even such a frame devoid of the "sequence control field". For example, the [ACK] frame corresponds to this kind. In this case, it is allowable to specify the time-wise sequence of the frames by substituting the "sequence control field" value of the pairing data frame for the frame devoid of the ID number. The wireless channel 9114 serves as data for specifying a wireless channel used for measuring the reception of frames in the above measurement result data. The antenna identifying number 9115 serves as data for specifying the antenna used for measuring the reception of frames in the above measurement result data in any of wireless receiving stations provided with plural antennas. The reception signal intensity value 9116 constitutes a numeric value designating intensity of the received signals of the frames in the above measurement result data measured at a corresponding wireless receiving station. The reception time 9117 is expressed by a numeric value designating the reception time of the frames in the above measurement result data measured at a corresponding wireless receiving station.

Figure 10:
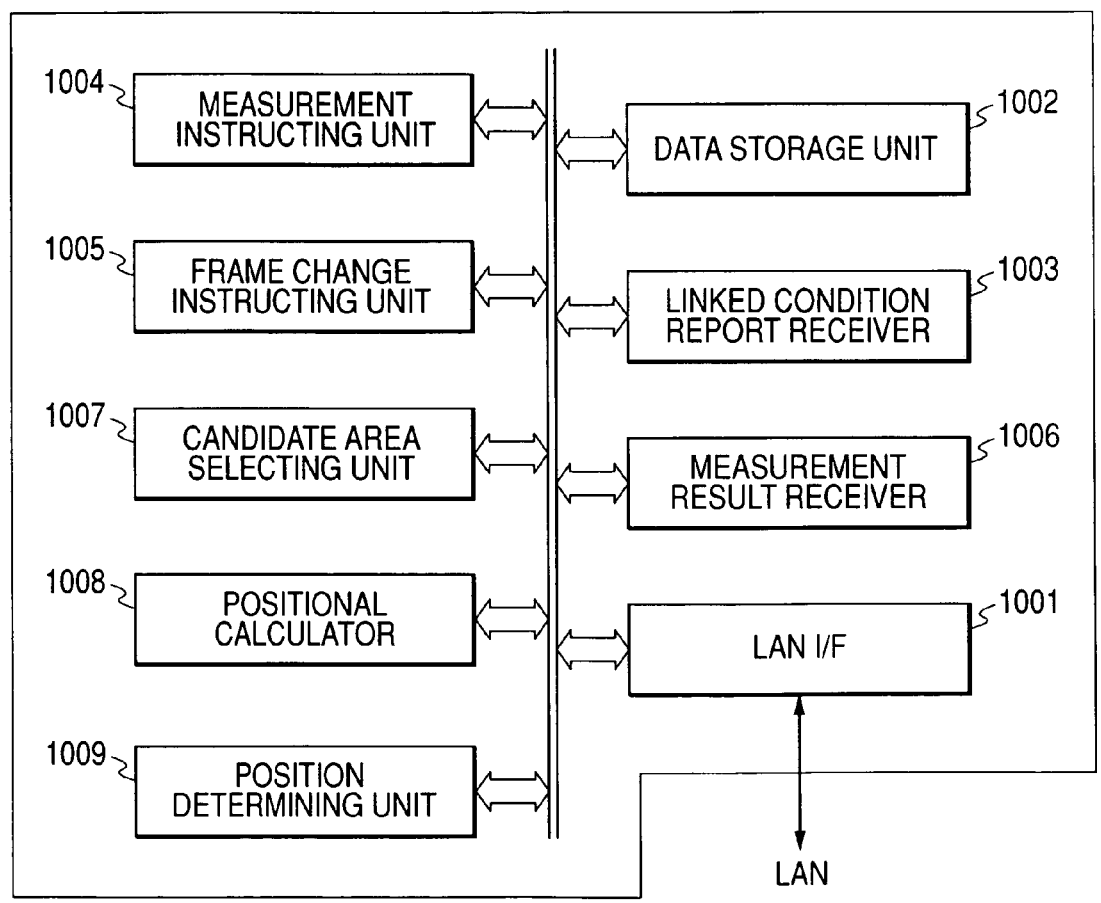
FIG. 10 is a schematic block diagram exemplifying a configuration of the terminal position computing unit in the wireless terminal position detecting system related to the present invention.

Next, referring to FIG. 10, configuration of the position computing unit 1C1 applied to the execution of the positional detection flowchart shown in FIG. 5 is described below. The position computing unit 1C1 comprises the following: a local area network interface (LAN I/F) 1001; a data storage unit 1002; a linked state report receiving unit 1003, a measurement instructing unit 1004, a frame exchange instructing unit 1005; a measured result receiving unit 1006; a candidate area selecting unit 1007, a position calculating unit 1008; and a position determining unit 1009. The LAN I/F 1001 enables the position computing unit 1C1 to communicate with any of the wireless receiving stations, base stations, or wireless terminals linked with the LAN. The data storage unit 1002 stores various data shown in FIGS. 2, 3, and 4 so as to enable the position computing unit 1C1 to effectively detect the actual position of an objective wireless terminal. The linked state report receiving unit 1003 enables the position computing unit 1C1 to properly receive data of an objective wireless terminal linked with a base station from this base station. The measurement instructing unit 1004 generates instructions so as to enable any of the wireless receiving stations to properly receive and measure a predetermined frame transmitted from a predetermined wireless terminal or a predetermined base station. The frame exchange instructing unit 1005 urges any of the base stations so as to enable said base station to exchange a predetermined frame with a predetermined wireless terminal based on an appropriate timing. The measured result receiving unit 1006 receives the measured results transmitted from individual wireless receiving stations. The candidate area selecting unit 1007 selects a candidate area most suitable for detecting the actual position of an objective wireless terminal based on the above-described method and by referring to the data of a base station as the linked destination of the objective wireless terminal and also referring to the received data designating the measured result. The position calculating unit 1008 calculates the actual positions of wireless terminals per candidate area based on the above-described method and by referring to the results measured by individual wireless receiving stations allocated for respective candidate areas. The position determining unit 1009 determines the actual position of an objective wireless terminal after comparing the results of the positional calculation in respective candidate areas based on the above described method. When executing the present invention, it is also practicable to implement the above-described operational devices as the programmable object on a computer, wherein the objective devices include the linked state report receiving unit 1003, the measurement instructing unit 1004, the frame exchange instructing unit 1005, the measured result receiving unit 1006, the candidate area selecting unit 1007, the position calculating unit 1008, and the position determining unit 1009.

Figure 11:
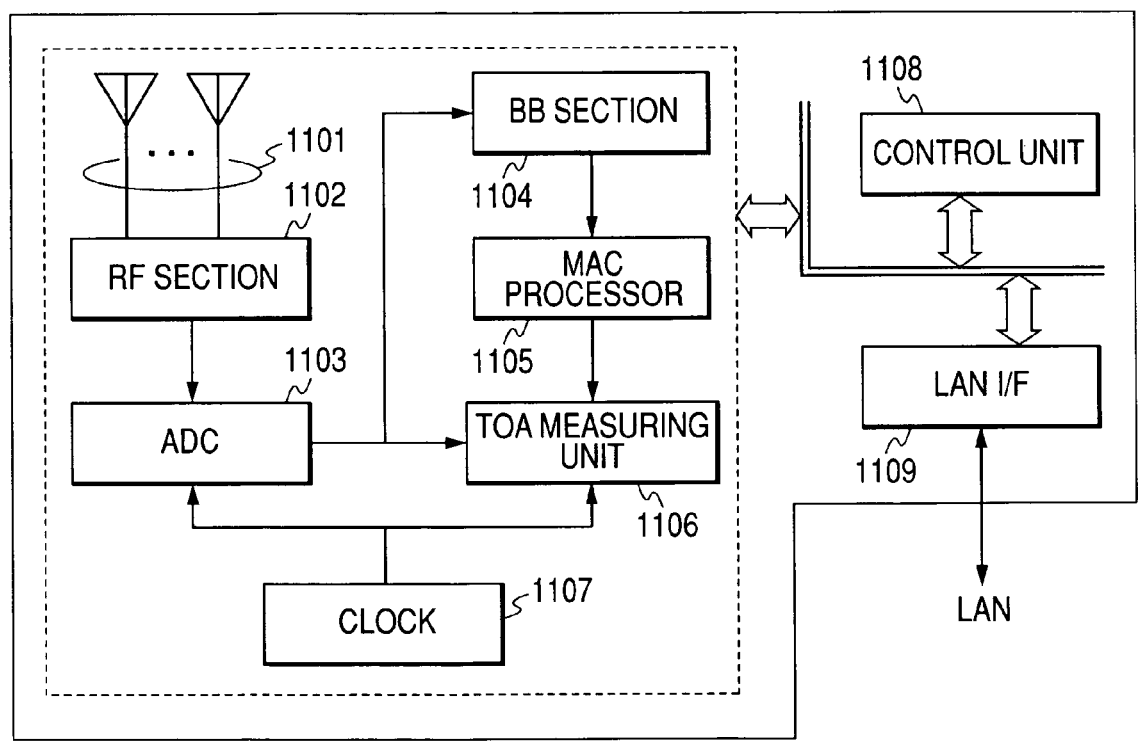
FIG. 11 is a schematic block diagram exemplifying a configuration of a wireless receiving station in the wireless terminal detecting system related to the present invention.

Next, referring to FIG. 11, configuration of a wireless receiving station operated for executing the positional detection flowchart shown in FIG. 5 is described below. The wireless receiving station shown in FIG. 11 comprises the following: an antenna 1101, a high-frequency (RF) converter 1102, an A/D converter 1103, a base-band (BB) signal demodulator 1104, a media access control (MAC) processor 1105, a time of arrival (TOA) measuring unit 1106, a clock 1107, a controlling unit 1108, and a LAN I/F 1109. The antenna 1101 receives data frames (comprising wireless packet signals) from a wireless terminal or a base station. The RF converter 1102 converts high-frequency signals in a predetermined wireless channel into base-band signals. The A/D converter 1103 converts analog base-band signals into digital base-band signals based on clock pulses output from the clock 1107. Sampling frequency during the conversion process is arranged to be more than double the limited band frequency so as to facilitate reproduction of the band-limited base-band signals. The base-band signal demodulator 1104 demodulates base-band signals and then outputs binary digits consisting of {0 and 1} for example. Further, the base-band signal demodulator 1104 acquires the intensity value of the received frame signals in linkage with the RF converter 1102. The MAC processor 1105 analyzes the MAC header from the demodulated binary digits and then identifies whether or not the frame received by a corresponding wireless receiving station is identical to the predetermined frame transmitted from a predetermined wireless terminal or a predetermined base station. The TOA measuring unit 1106 measures the arrival time of a frame appearing in the digital base-band signal output from the A/D converter 1103 by referring to clock pulses output from the clock 1107. In response to the above-cited measurement instructions, in order to measure the reception of a predetermined frame data delivered from a predetermined wireless terminal or a predetermined base station, the controlling unit 1108 properly controls operations of the antenna 1101, the RF demodulator 1102, the base-band signal processor 1104, the MAC processor 1105, and the TOA measuring unit 1106. Further, in linkage with the above operational units, the controlling unit 1108 compiles the measurement result data related to a predetermined wireless terminal or a predetermined base station and then submits a report to the position computing unit 1C1. The LAN interface enables the corresponding wireless receiving station to communicate with the position computing unit 1C1 on the local area network.

Figure 12:
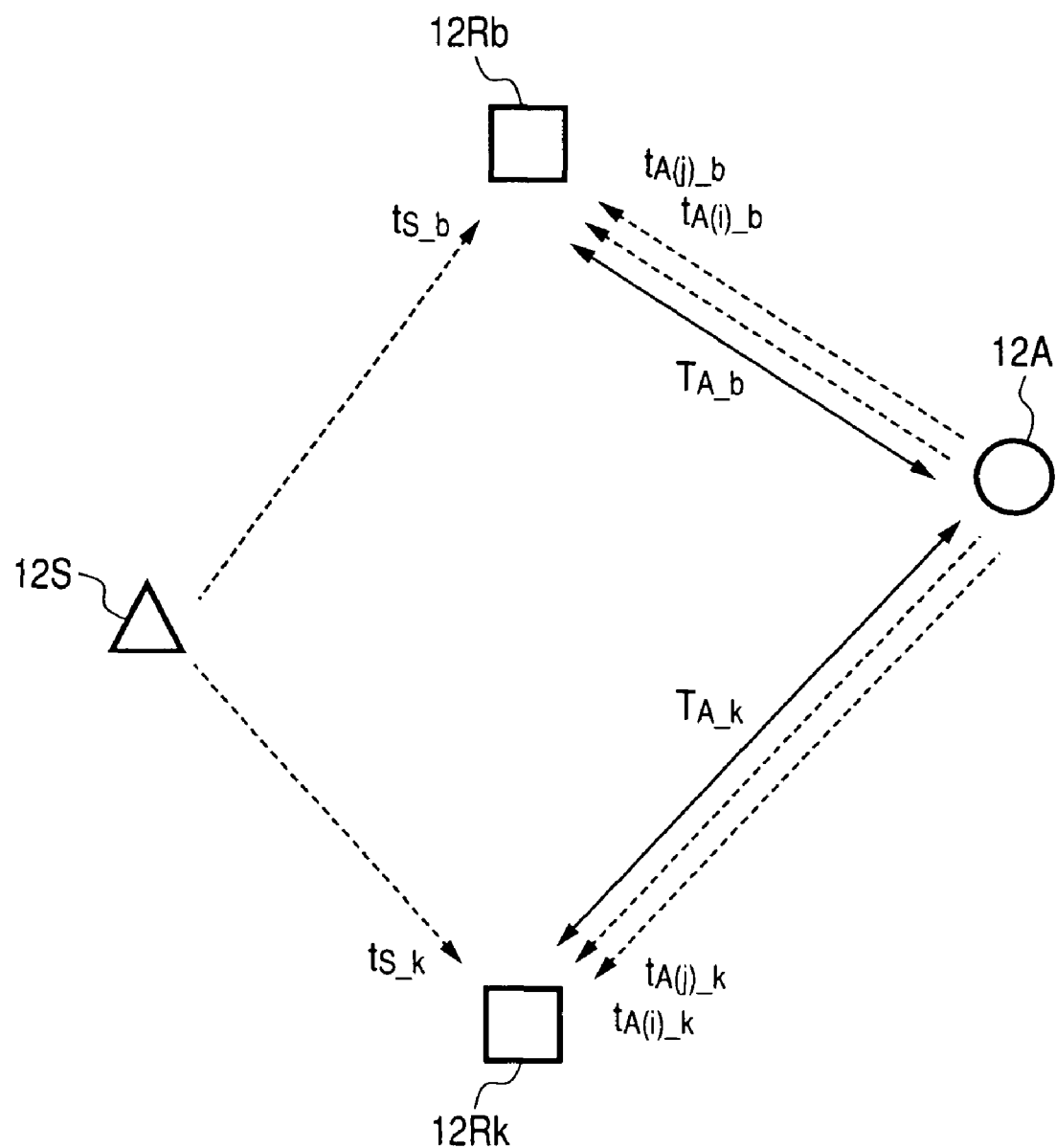
FIG. 12 is a schematic diagram exemplifying the relationship between individual system components for explanatory of clock correction between wireless receiving stations in the wireless terminal position detecting method related to the present invention.
Figure 13:
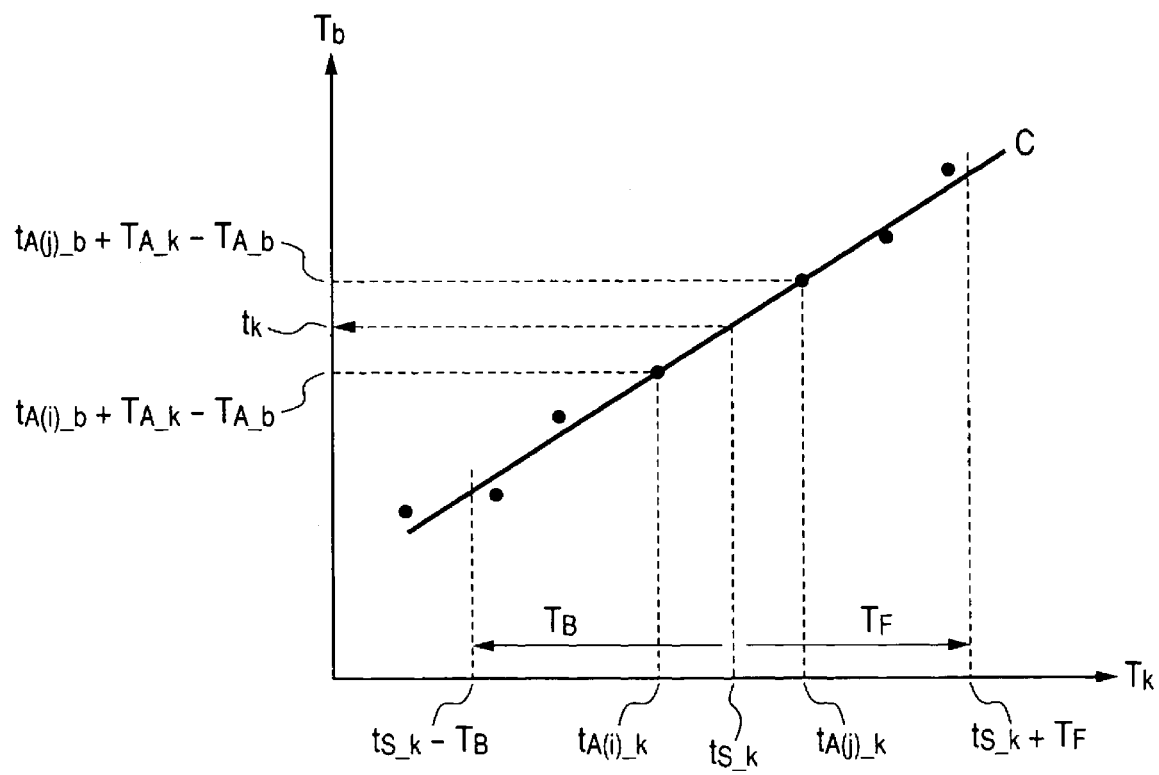
FIG. 13 is a graphic chart for explanatory of the clock correction between wireless receiving stations in the wireless terminal position detecting method related to the present invention.

The following description refers to a method for correcting the time of the reception of frames from a wireless terminal after measuring the frame received time on the part of plural wireless receiving stations, wherein the individual frame reception times are subject to correction into the reference clock time borne in a sole reference wireless receiving station among a plurality of the corresponding wireless receiving stations. Correction of the frame received time is achievable between plural wireless receiving stations solely when plural wireless receiving stations simultaneously measure the reception of an identical frame from a base station after respectively completing a measurement of the reception of a frame from a wireless terminal. Referring now to FIGS. 12 and 13, the procedure for correcting the frame reception time is exemplified below.

In FIG. 12, a wireless receiving station 12Rb and another wireless receiving station 12Rk are respectively in the condition capable of measuring the time of receiving frame data transmitted from a base station 12A. Further, both of the above wireless receiving stations 12Rb and 12Rk are in the condition capable of measuring the time of receiving frame data transmitted from a wireless terminal 12S. Since the position computing unit 1C1 stores the data shown in FIGS. 3 and 4, the actual positions of the above wireless receiving stations 12Rb and 12Rk, and the base station 12A, are previously known. Hence, the theoretical frame transmitting time $T_{A\_k}$ between the base station 12A and the wireless receiving station 12Rb can be sought readily. Assume that a frame (i) and another frame (j) were respectively transmitted from the base station 12A, and then reception time of both frames was measured by means of clocks built in the above wireless receiving stations 12Rb and 12Rk. For example, it is so arranged that the reception time of the frame (i) on the part of the wireless receiving station 12Rb shall be designated as $t_{A(i)\_b}$, whereas the reception time of the other frame (j) shall be designated as $t_{A(j)\_k}$ in the embodiment of the present invention. Assume further that another frame was also transmitted from a wireless terminal 12S, and then the reception time of this frame was measured by clock pulses on the part of the above wireless receiving stations 12Rb and 12Rk. In this case, the reception time of this frame at the wireless receiving station 12Rb is designated as $t_{S\_b}$ whereas the reception time of this frame at the other wireless receiving station 12Rk is designated as $t_{S\_k}$.

FIG. 13 designates a method of correcting the reception time $t_{S\_k}$ at the wireless receiving station 12Rk into the reception time tk on the time axis Tb of the other wireless receiving station 12Rb. For example, the reception time $t_{A(i)\_k}$ of the frame (i) at the wireless receiving station 12Rk can be converted into the time $t_{A(i)\_b+} T_{A\_k-} T_{A\_b}$ on the time axis Tb of the other wireless receiving station 12Rb. Likewise, the reception time $t_{A(j)\_k}$ of the frame (j) at the wireless receiving station 12Rk can be converted into the time $t_{A(j)\_b+} T_{A\_k-} T_{A\_b}$ on the time axis Tb of the wireless receiving station 12Rb.

By referring to the reception time of the above frames (i) and (j) transmitted from the base station 12A to the above recipient wireless receiving stations 12Rb and 12Rk, it is possible to formulate an equation of a linear line C denoting a variation of clock time of the wireless receiving station 12Rb against the other wireless receiving station 12Rk. Further, by applying the equation of this linear line C, it is possible to correct the reception time $t_{S\_k}$ on the part of the wireless receiving station 12Rk into the reception time tk on the time axis Tb of the wireless receiving station 12Rb.

In the case in which the clock variation rate of the wireless receiving station 12Rb against that of the other wireless receiving station 12Rk approximates to 1, it is possible to acquire an equation related to the linear line C based on the reception time of a single unit of frame transmitted from the base station 12A to the above wireless receiving stations 12Rb and 12Rk.

Further, in the case in which the reception time of more than 3 frames transmitted from the base station 1A to the above wireless receiving stations 12Rb and 12Rk is previously known, for example, it is possible to acquire an equation formulating a linear line (curved line) designating the variation of clock time of the above wireless receiving station 12Rb against that of the other wireless receiving station 12Rk by applying the linear approximation (including the curve approximation) based on the least-squares method. In order to realize a more exact approximation, it is also possible to limit the reception time of the frame transmitted from the based station 12A to the above wireless receiving station 12Rk, at a point between the time TB and the time TF in advance of and after the reception time $t_{S\_k}$ of the frame transmitted from the base station 12S to the above wireless receiving station 12Rk.

By applying the above-described correction method, it is possible to precisely correct the time of receiving frames transmitted from any wireless terminal to a plurality of wireless receiving stations into the reference clock time of a sole reference wireless receiving station among a plurality of corresponding wireless receiving stations.

For example, referring to FIG. 1, it is possible to correct the reception time of a frame transmitted from the wireless terminal 1S2 to the wireless receiving station 1R33 allocated for the position detectable area 1Z2 into the clock time of the wireless receiving station 1R73 based on the reception time of frames transmitted from the base station 1A1 to the wireless receiving stations 1R33 and 1R73. Further, it is also possible to correct the reception time of the frame transmitted from the wireless terminal 1S2 to the wireless receiving stations 1R42, 1R52, 1R62, and 1R73, into the clock time of the wireless receiving station 1R73 based on the reception time of frames transmitted from the base station 1A2 to the wireless receiving stations 1R42, 1R52, 1R62, and 1R73. Eventually, it is possible to correct the reception time of frames transmitted from the wireless terminal 1S2 to the wireless receiving stations 1R33, 1R42, 1R52, 1R62, and 1R73 allocated for the position detectable area 1Z2 into the clock time held in the wireless receiving station 1R73.

Embodiment 2

Figure 15:
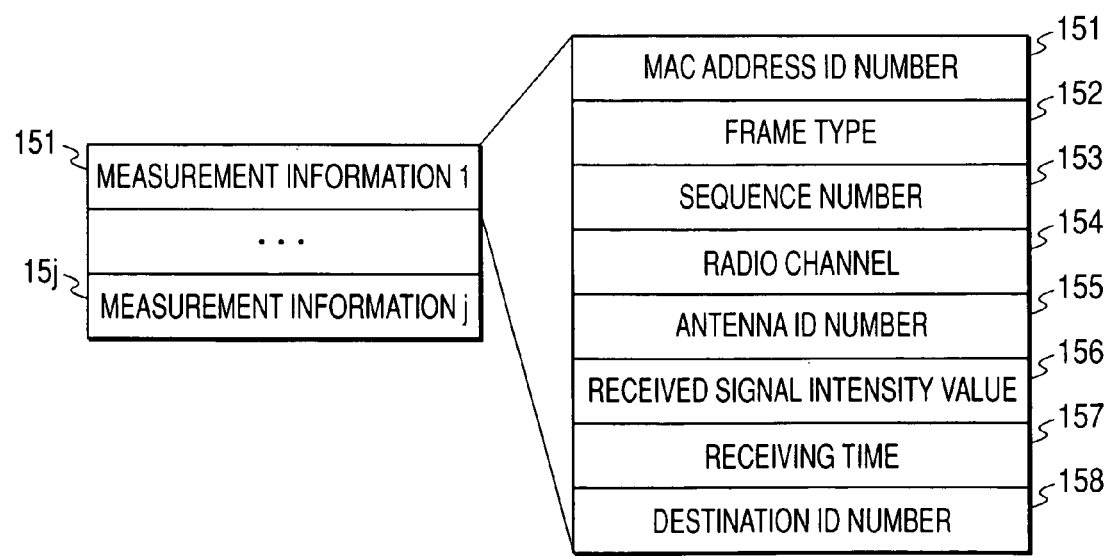
FIG. 15 is a formatted system configuration exemplifying another case of the measurement result reported from a wireless receiving station in the wireless terminal position detecting method related to the present invention.

When executing the operational flowchart shown in FIG. 5, it is allowable to apply the measurement result shown in FIG. 15. Compared to the measurement result shown in FIG. 9, for example, the second embodiment features that the identification No. 158 of the transmission destination is included in the measurement information. The transmission destination identification number specifies the transmission destination of the received frame complete with the reception time measurement. For example, the MAC address is applicable thereto. In the case of the ID No. 158 cited above, by way of jointly analyzing an ID number 151 together with the frame type 152, it is possible to specify the base station linked with an objective wireless terminal. For example, when the ID number 151 denotes a certain wireless terminal whereas the frame type 152 designates [ACK], in this case, it designates that the transmission destination ID number 158 corresponds to the base station linked with this wireless terminal. In this way, by applying the measurement result shown in FIG. 15, it is possible to dispense with the function to execute the linked state reporting step S523 included in the operational flowchart shown in FIG. 5, which is otherwise applicable to the base station. Hence, the present invention enables a flexible selection of a base station suitably applicable to the invented system, thereby facilitating the cost reduction.

For example, when setting and operating a system for specifying the actual position of a human-portable wireless LAN terminal in an indoor environment inside any of a plurality of buildings or plural floors, the system embodied by the present invention is most effectively operable.

What is claimed is:

1. A wireless terminal position detecting method, comprising steps of:
    selecting position detecting areas available for detecting positions of individual terminals after evaluating results of measurements on wireless signals from said individual terminals received by individual wireless receiving stations;
    correcting reception times of said wireless signals from said individual terminals measured by said individual wireless receiving stations by referring to a respective time period for receiving wireless signals from base stations measured by each individual wireless receiving station;
    determining said positions of said individual terminals in a plurality of wireless receiving stations each allocated for a respective position detecting area of said selected position detecting areas according to the reception times of said wireless signals from said individual terminals by computing a corresponding position of each of said individual terminals in each of more than one of said position detecting areas and comparing the corresponding positions of each of said individual terminals for said more than one of said position detecting areas; and
    wherein each of the steps is based on a definition of a plurality of position detecting areas respectively designating a geographical range available for detecting positions of wireless terminals and also based on a definition for specifying a plurality of wireless receiving stations having previously known positions allocated for individual position detecting areas required for detecting terminal positions in respective position detecting areas;
    wherein determining said positions of said individual terminals further comprises:
    calculating a respective minimum square error value for each of said individual terminals for each of said more than one of said position detecting areas that is normalized by a number of said individual receiving stations in the said position detecting area;
    identifying a lowest and a next lowest minimum square error value for each of said individual terminals;
    determining said position of each of said individual terminals to be said position computed for said individual terminal in said position detecting area corresponding to the lowest minimum square error value for said individual terminal if a difference between the lowest minimum square error value for said individual terminal and the next lowest minimum square error value for said individual terminal is less than a predetermined threshold;
    calculating an intermediate value for each minimum square error value for each of said individual terminals that is less than the predetermined threshold if the difference between the lowest minimum square error value for said individual terminal and the next lowest minimum square error value for said individual terminal is less than a predetermined threshold, the intermediate value for each minimum square error value for each of said individual terminals being calculated based on a respective non-zero weighing coefficient for said individual terminal for said position detecting area corresponding to said minimum square error value; and
    determining said position of each of said individual terminals to be said position computed for said individual terminal in said position detecting area corresponding to the highest intermediate value if the difference between the lowest minimum square error value for said individual terminal and the next lowest minimum square error value for said individual terminal is less than a predetermined threshold.

2. A position computing unit comprising:
    a local area network interface enabling wireless receiving stations and base stations on a local area network to communicate with each other;
    an information storage unit for storing information related to base stations and wireless receiving stations respectively compatible with position detectable areas and a position detected area defined via division of a specific area subject to detection of the terminal position into plural parts;
    a measurement result receiver unit for receiving the results of signal measurements from terminals located in said plural wireless receiving stations;
    a candidate area selecting unit for selecting candidate position detecting areas available for detecting positions of said terminals via evaluation of the reception measurement results per said position detectable area;
    a position computing unit for computing the terminal position per said candidate position detectable area; and
    a position determining unit for performing a comparison of the terminal positions computed for each of said candidate position detectable areas and determining the terminal positions according to results of the comparison;
    wherein said position determining unit performs the comparison of the terminal positions computed for each of said candidate position detectable areas by:
    calculating a respective minimum square error value for each of said terminals for each of said candidate position detectable areas that is normalized by a number of said receiving stations in the said candidate position detecting area, identifying a lowest and a next lowest minimum square error value for each of said terminals, and calculating an intermediate value for each minimum square error value for each of said terminals that is less than a predetermined threshold if a difference between the lowest minimum square error value for said terminal and the next lowest minimum square error value for said terminal is less than the predetermined threshold, the intermediate value for each minimum square error value for each of said terminals being calculated based on a respective non-zero weighing coefficient for said terminal for said candidate position detecting area corresponding to said minimum square error value, and wherein said position determining unit determines the terminal positions according to the results of the comparison by:

determining said terminal position of each of said terminals to be said terminal position computed for said terminal by said position computing unit in said candidate position detecting area corresponding to the lowest minimum square error value for said terminal if the difference between the lowest minimum square error value for said terminal and the next lowest minimum square error value for said terminal is less than the predetermined threshold, and determining said terminal position of each of said individual terminals to be said terminal position computed by said position computing unit for said terminal in said candidate position detecting area corresponding to the highest intermediate value if the difference between the lowest minimum square error value for said terminal and the next lowest minimum square error value for said terminal is less than a predetermined threshold.

3. A wireless terminal position detecting system comprising:

one or more than one of the wireless terminals;

a plurality of wireless base stations;

a plurality of wireless receiving stations individually having a function to measure the time of receiving wireless signals transmitted from said wireless terminals and said wireless base stations; and a position computing unit, wherein said position computing unit comprises:

a local area network interface enabling wireless receiving stations and base stations on a local area network to communicate with each other;

an information storage unit for storing information related to base stations and wireless receiving stations respectively compatible with position detectable areas and a position detected area defined via division of a specific area subject to detection of the terminal position into plural parts;

a measurement result receiver unit for receiving the results of signal measurements from terminals located in said plural wireless receiving stations;

a candidate area selecting unit for selecting candidate position detecting areas available for detecting positions of said terminals via evaluation of the reception measurement results per said position detectable area;

a position computing unit for computing the terminal position per said candidate position detectable area; and a position determining unit for performing a comparison of the terminal positions computed for each of said candidate position detectable areas and determining the terminal positions according to results of the comparison, and wherein said information storage unit stores the following:

information for defining said position detectable areas and said individual wireless stations such that each of said individual wireless stations is allocated to correspond with a respective position detectable area of said position detectable areas;

information for enabling individual wireless receiving stations to correspond with network addresses on the part of the infrastructure, positions of said wireless receiving stations, and each base station to be measured by said wireless receiving stations; and information for enabling base stations to correspond with wireless network addresses on the terminal side, network addresses on the part of said infrastructure, an existing physical layer standard, corresponding wireless channels, positions of said base stations, and the existing area of terminals connectable to said base stations;

wherein said position determining unit performs the comparison of the terminal positions computed for each of said candidate position detectable areas by:

calculating a respective minimum square error value for each of said terminals for each of said candidate position detectable areas that is normalized by a number of said receiving stations in the said candidate position detecting area, identifying a lowest and a next lowest minimum square error value for each of said terminals, and calculating an intermediate value for each minimum square error value for each of said terminals that is less than a predetermined threshold if a difference between the lowest minimum square error value for said terminal and the next lowest minimum square error value for said terminal is less than the predetermined threshold, the intermediate value for each minimum square error value for each of said terminals being calculated based on a respective non-zero weighing coefficient for said terminal for said candidate position detecting area corresponding to said minimum square error value, and wherein said position determining unit determines the terminal positions according to the results of the comparison by:

determining said terminal position of each of said terminals to be said terminal position computed for said terminal by said position computing unit in said candidate position detecting area corresponding to the lowest minimum square error value for said terminal if the difference between the lowest minimum square error value for said terminal and the next lowest minimum square error value for said terminal is less than the predetermined threshold, and determining said terminal position of each of said individual terminals to be said terminal position computed by said position computing unit for said terminal in said candidate position detecting area corresponding to the highest intermediate value if the difference between the lowest minimum square error value for said terminal and the next lowest minimum square error value for said terminal is less than a predetermined threshold.

* * * * *